July 29, 1969  B. R. ANKERSEN  3,457,883
INCINERATORS AND METHODS OF INCINERATION
Filed May 8, 1967  2 Sheets-Sheet 1

INVENTOR.
Borge Richard Ankersen
BY
Buell, Blenko&Ziesenheim
his ATTORNEYS

July 29, 1969     B. R. ANKERSEN     3,457,883

INCINERATORS AND METHODS OF INCINERATION

Filed May 8, 1967

INVENTOR.
Borge Richard Ankerson his ATTORNEYS

United States Patent Office 3,457,883
Patented July 29, 1969

3,457,883
INCINERATORS AND METHODS OF
INCINERATION
Borge Richard Ankersen, 2420 Private Drive, Lake
Angelus, Pontiac, Mich. 48055
Filed May 8, 1967, Ser. No. 636,788
Int. Cl. F23g 5/00, 1/00, 3/00
U.S. Cl. 110—10                    12 Claims

ABSTRACT OF THE DISCLOSURE

An incinerator for garbage having a main combustion chamber, means for shreading and feeding garbage tangentially into the main combustion chamber to cause a downward vortex, a primary combustion chamber fired by a high calorific fuel opening into the main chamber to provide a high temperature area axially thereof, a secondary combustion chamber connected to the top of the main chamber receiving products of combustion and unconsumed particles to complete combustion, a vortex zone receiving the products of combustion from the secondary combustion chamber connected to the top of the changer where heat is extracted from the products of combustion and a scrubber receiving the cooled combustion products for cleaning and discharge to the air.

---

Figure 1:
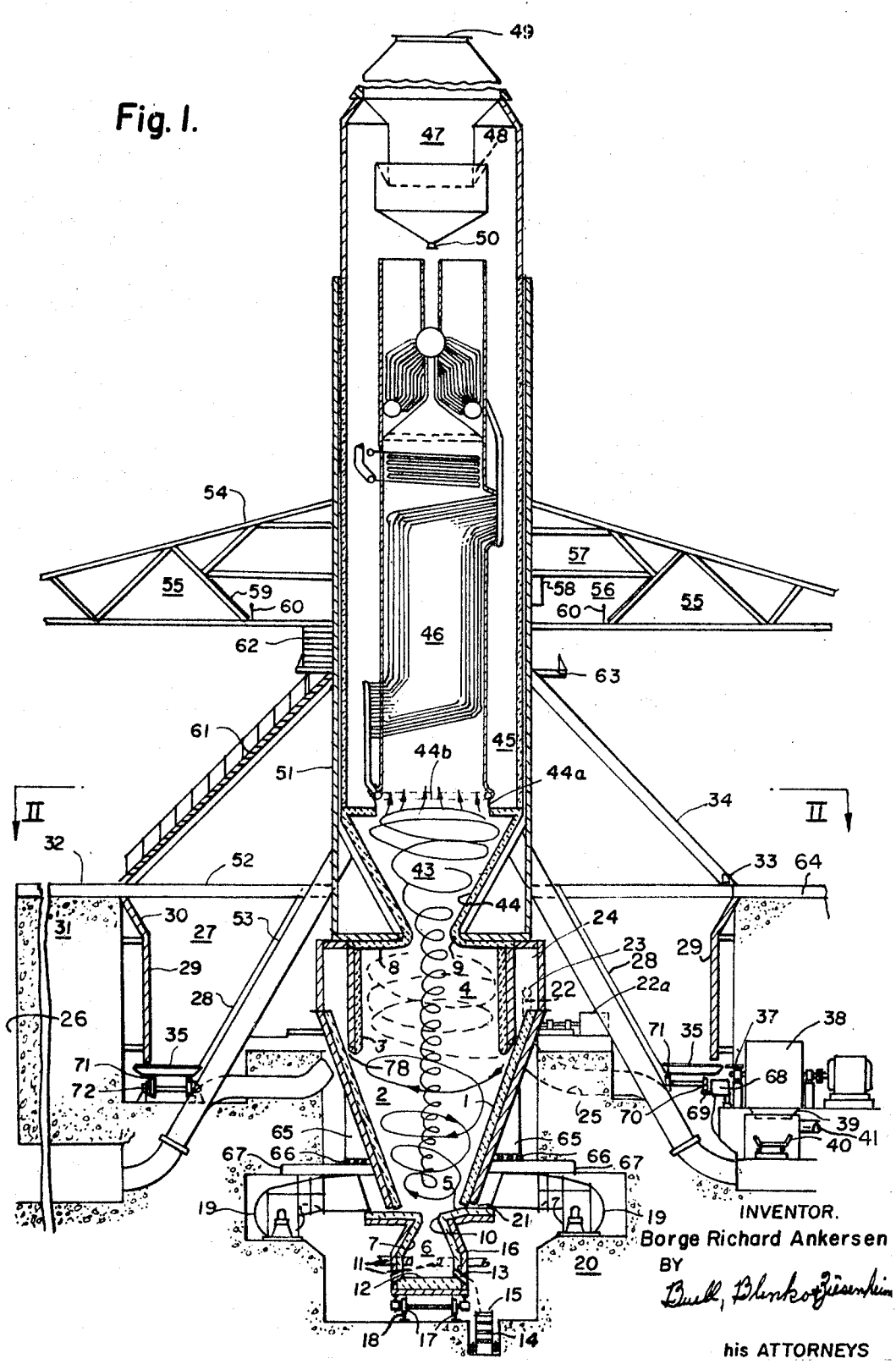

This invention relates to incinerators and methods of incineration and particularly to an incinerator structure which operates at high temperatures to produce a fused residue or ash and which is smaller, more efficient and less costly to build and operate than incinerators now being used and in which the heat generated is recovered as a power source.

Existing types of incinerating plants are very large and costly to build and very inefficient in operation. They employ a large number of men to operate large, inefficient furnaces, which leave a large percentage of ashes containing substantial portions of completely unburned materials which when deposited on nearby ash dumps, attract rats and other vermin as was the case with the garbage dumps, which preceded the ash dumps and which incinerators were intended to eliminate. In nearly all of these plants, the standard practice is to have the garbage trucks dump their loads into a receiving pit large enough to hold one to two days production for the entire plant—in most cases 1000 to 2000 tons of raw, rotting, smelling garbage. From the pit, overhead cranes with large grabbuckets pick the mixed refuse and load it into the charging hoppers of the furnaces, which require continual manual attention and stoking to perform an even passable job of destroying the refuse.

To handle the ashes and other residue, long, complicated systems of quenching troughs and conveyors with separators and with a large number of men attending these are continually being kept in operation. Maintenance and operating cost on these plants are quite high.

The object of this invention is to eliminate all of these difficulties and at the same time produce a completely clean, sanitary, even sterile residue material, which can be sold for many useful purposes such as road material and building blocks. Another object is to eliminate the highly unsanitary and unhealthy fly-ashes and fumes issuing from the stacks of the old style incinerators and also to eliminate the need for storing and re-handling the refuse and garbage once it has been received at the plant, thus also eliminating the breeding places for rats and eliminating the undesirable odors so commonly emanating from the old style plants.

Still another object of this invention is to provide a facility in which the heat energy from the burning refuse can be converted into steam and/or electric energy at the lowest possible expenditure of additional equipment and at the highest possible rate of efficiency.

A further object of the invention is to provide means for handling any and all sizes and types of refuse material received from the garbage collection trucks of an urban area which might range from ordinary kitchen refuse to dead domestic animals, rubber tires to refrigerators, stoves and hot water heaters and parts of automobiles.

Preferably, I provide a main combustion chamber in the form of an inverted cone having an open apex, a fire box or primary combustion chamber beneath the main combustion chamber and connected thereto through said open apex, means for feeding a high calorific fuel to said primary combustion chamber, means for selectively introducing air under pressure into the open apex, means for introducing refuse to be incinerated and air tangentially at the top of the main combustion chamber, a secondary combustion chamber opening into the top of the main combustion chamber axially thereof receiving the products of combustion and fluidized ash and unburned particles for further combustion. A vortex section is superposed above and connected to the secondary combustion chamber receiving the final products of combustion, a heat exchanger section receives the gases from the vortex chamber to extract the heat therefrom, and a gas cleaner section receives the gaseous materials from the heat exchanger section for removing traces of particulate material. Preferably, I provide a refuse receiving station adjacent the furnace, a shredder means receiving refuse from the receiving station to shred the same, a source of high pressure fluidizing air delivering air to a shredded refuse delivery system, a shredded refuse storage area and connections from the shredded refuse storage area and the shredder means to the means for introducing refuse to the main combustion chamber. Preferably the primary combustion chamber is mounted on wheels for movement into and out of position beneath the main combustion chamber and is provided with a slag discharge spout delivering molten residues from the primary combustion chamber to an adjacent quench tank.

Figure 2:
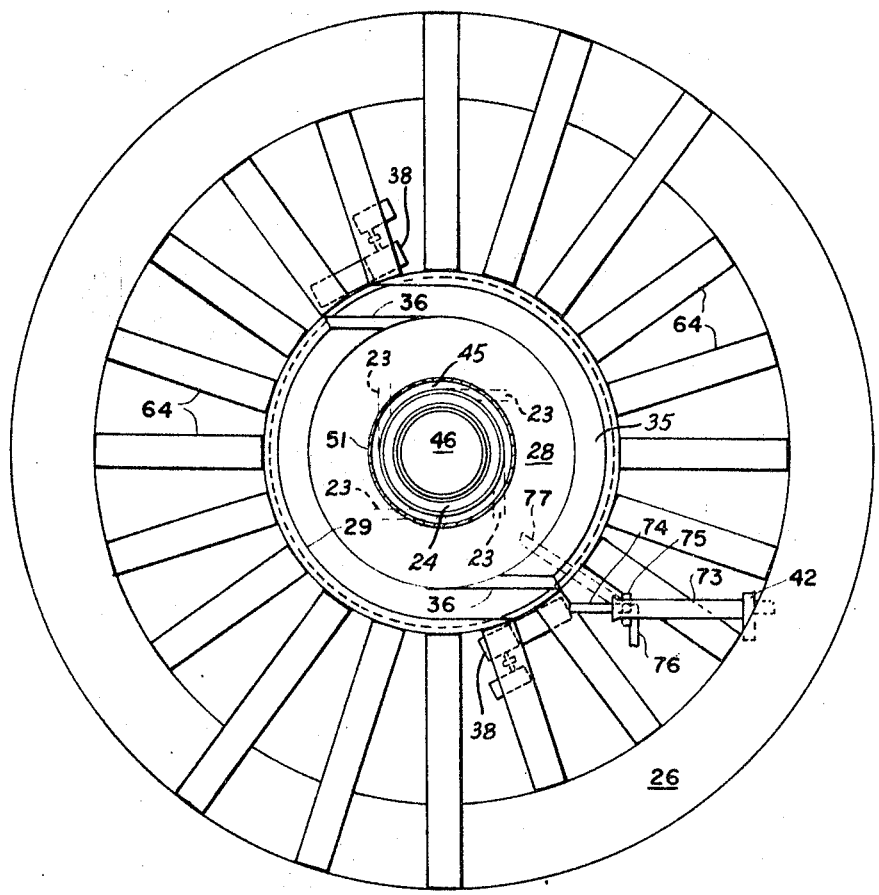

In the foregoing general statement of my invention I have outlined certain objects, purposes and advantages of my invention. Other objects, purposes and advantages will be apparent from a consideration of the following description and the accompanying drawings in which:

FIGURE 1 is a vertical section through an incinerator according to my invention; and FIGURE 2 is a section on the line II—II of FIGURE 1.

Referring to the drawings I have illustrated an incinerator which consists of a cone-shaped refractory hearth 1 surrounding a main combustion chamber 2 within the volume of which the major part of the combustion of the refuse takes place. Extending some distance down within the upper part of hearth 1 is cylindrical refractory lined wall 3 surrounding the secondary combustion chamber 4. At the top of the secondary combustion chamber, the wall 3 terminates in a roof 8 extending into a throat opening 9 at its center.

Below the bottom of hearth 1 is a circular melting hearth 5 with a circular opening 10 at its center leading into a primary combustion chamber or fire box 6 having at the top 6 a generally saucer shaped refractory lined annulus surrounding refractory lined walls 7 shaped as an inverted cone extending downwardly into a cylindrical section in which gas burners 11 are positioned for tangential firing into primary combustion chamber 6. The refractory lined bottom 12 of primary combustion chamber 60 collects the residue of the combustion process in the form of molten slag which is discharged through tap hole 13 into water-filled quench tank 14. The slag is quenched and granulated and then removed by conveyor 15 to a waiting truck or the like.

Primary combustion chamber 6 is surrounded by a reinforced steel shell 16 and supported on railroad-type wheels 17 riding on track 18 supported on the concrete floor of the pit to facilitate removal of the primary combustion chamber structure for maintenance and replacement by another identical chamber structure while maintenance is being performed away from the operating portion of the furnace. Two secondary combustion air fans 19 are located within the concrete foundation 20 surrounding the furnace and are positioned to provide tagential high velocity preheated combustion air to the lower section of main combustion chamber 2 through annular inlet orifices 21 between the main hearth 1 and the upper surface of melting hearth 5. Four primary combustion air and material feed blowers 22 driven by motors 22a are located on the top of foundation 20 and positioned to provide high velocity tangential injection of combustion air carrying shredded refuse to be burned within the furnace through duct 23 into inlet manifold 24 completely surrounding the outside reinforced steel shell of wall 3 at the top of the furnace. Inlet duct 25 carries air and material to blower 22 from storage area 26. Surrounding the furnace is an annular receiving hopper 27 defined by inner conical steel wall 28 and outer cylindrical steel wall 29. The upper part of cylindrical wall 29 is flared outwardly by conical upper section 30 to coincide with the outside diameter of the pit opening and the outer concrete foundation 31 on top of which is the operating floor 32. Trucks arrive on operating floor 32 and back up against the steel bumper 33 supported between structural steel braces 34. At the bottom of the receiving hopper 27 is a bottom conveyor 35 carrying the received material to tangential track discharge guide 36 which guides the refuse over bridge plate 37 into hammer mill 38. Below the discharge chute 39 of hammer mill 38 is located vibrating conveyor 40 for discharge of the heavier materials and pneumatic conveying duct 41 for carrying the lighter materials through material handling fans 42 into storage area 26.

Above throat 9, the products of combustion from the top of the furnace expand into vortex section 43 surrounded by inverted cone-shaped refractory lined walls 44 terminating in a restricting plate 44a having an orifice 44b at the base of stack 45. Within stack 45 is located high pressure steam boiler 46 above the top of which is suspended within the confines of the stack high efficiency flue gas scrubber 47 with flue gas inlet 48 and flue gas discharge and discharge opening for flue gases 49. At the bottom point of scrubber 47 is discharge pipe 50 for the discharge of fly ash-contaminated water which is piped directly to quench tank 14 at the bottom of the concrete foundation.

The stack structure is surrounded by stack columns 51 which are supported at the bottom by floor beams 52 and tubular supports 53. A circular roof 54 covers the entire operating area of the plant and is supported by roof trusses 55 which are carried by stack columns 51 around the stack.

Within the roof trusses are located a circular-shaped control room 56 and administration offices 57. Control panels 58 mounted on the inner circular wall of control room 56 contain all electronic instrumentation for the operation of the plant. Occupying the entire outer wall of the control room are large windows 59 providing the operators of the plant with a full and unobstructed view of all of the activities on the operating floor 32 below. Recessed into the surface of operating surface 32 are twenty truck scales 64 reaching out radially from the outer edge of receiving hopper 30. Preventing the operators from inadvertently walking into windows 59 is guard rail 60. Stairways 61 and 62 lead from the operating floor 32 to control room 56. Landing and maintenance platform 63 completely surrounds the stack at the upper end of braces 34.

The main hearth 1 of the furnace is supported by steel legs 65 through expansion rollers 66 on structural steel supports 67 anchored in concrete foundation 20.

In my facility in a preferred embodiment, the receiving hopper 27, which at the outer edge is preferably about 108 feet in diameter, is arranged like an annular trench surrounding the furnace. The sides 28 and 29 of the hopper which are stationary, reach to within a short distance of the steel bottom 35 without touching it. The bottom 35 is arranged in the form of a circular steel turntable, 104 feet, 6 inches outside diameter and approximately 12 feet wide, resting on two inverted railroad tracks 71 which are formed in a circle along the horizontal plane to match the diameter of the turntable. These tracks 71 rest on a multitude of flanged railroad wheels 72 which are driven by gear motors 68 through pinion 69 and spur gear 70 causing the turntable 35 to rotate about the center-line of the furnace at a speed adjustably controlled by the operator.

Under operating conditions, trucks carrying refuse to the plant will arrive on the operating floor 32 in which scales 64 are located. The trucks back in on the scales until the rear wheel of the truck touches the bumper 33. It will then dump its load into receiving hopper 27 and turntable bottom 35, being in continuous rotating motion, will carry the discharged load circumferentially around within the hopper sides 28 and 29 to the point of tangential discharge. At this point, outer wall 29 of the hopper does not follow its otherwise cylindrical shape, but has a straight section extending tangentially to the intake opening of a large hammer mill type shredder 38. Directly opposing the tangential position of side 29 is a vertical tangential discharge guide 36 which prevents the burden of refuse on turntable 35 from being carried on around on its rotating path. When the burden reaches discharge guide 36, it is guided into the intake opening of the hammer mill and is shredded to small pieces. Upon being discharged through the bottom chute of the hammer mill, the shredded material is delivered to a high air velocity intake area of the pneumatic conveying system 73. This air velocity is so adjusted that all of the lighter parts of the shredded material will be carried through the air ducts 41 while the heavier parts will drop down into a vibrating conveyor 74 which will feed them over the surface of a magnetic separator 75. At the discharge side of the magnetic separator 75, the magnetic material will be carried by conveyor 76 to a truck on the operating floor of the plant for disposal. The non-magnetic materials will be carried by conveyor 77 to the charging opening of the furnace. All refuse containing garbage in any form whatever is picked up at the discharge point of the hammer mill by air passing into material duct 25 and is injected by blower 22 through discharge duct 23 into circular intake manifold 24 from which it is discharged at a very high velocity through annular discharge slot 78 tangentially into the main combustion chamber 2 of the furnace.

At the point of injection into the combustion chamber 2, the shredded material is carried around along the inside surface of refractory lined hearth 1 at a very high tangential velocity by the exact amount of air required for its perfect combustion. Due to its high annular velocity and its resulting centrifugal force acting on all of the unburned particles of the fuel, these particles will be forced against the very hot sidewalls of hearth 1 and those of the particles which are not combustible will melt and proceed to run down the steep inclined of the refractory to melting hearth 5 below. At this point heavier pieces of combustible material will burn, leaving the incombustible residue at the same point together with glass and various metallics which will melt together and run down hearth 5 through opening 10 into primary combustion chamber 6 and will collect on bottom hearth 12 as a molten slag which will then discharge through tap hole 13 into quench tank 14. As the stream of molten slag enters the water in the quench tank 14 the slag will suddenly solidify and shatter into small granular pieces which are then conveyed on a continuous basis out of quench tank 14 by conveyor 15 at the discharge point of which conventional conveyor means will bring the slag to a waiting truck or other means of disposal above on the operating floor. Gas burners 11 are positioned in the refractory wall of primary combustion chamber 6 so as to introduce tangentially a high velocity, high temperature flame into the primary combustion chamber. These burners are connected to conventional combustion blower, valves and other safety equipment to provide an independent self-contained combustion system for providing an accurately controlled high temperature at between 2800° F. and 3000° F. within the primary combustion chamber 6. As a result of the high angular velocity within this combustion chamber, the high temperature products of combustion issuing upward through circular opening 10 into main combustion chamber 2 will tend to follow the contour of melting hearth 5 and main hearth 1 thereby providing direct contact with the incoming unburned material for immediate ignition and stability of perfect combustion. Depending on the amount of heavier materials accumulating on melting hearth 5 due to the force of gravity in the furnace, secondary combustion blowers 19 will provide accurately controlled varying amounts of pre-heated combustion air tangentially injected at a very high velocity through annular slot 21. As the refuse laden primary combustion air spins around within main combustion chamber 2 following the contour of main hearth 1 gravity will force the particulate matter in this air stream down toward hearth 5 in a downward spiralling motion. The clean, hot products of combustion will converge at the lower edge of hearth 1 and then move toward the center to form a small diameter, upward spiralling pattern emerging upward through throat 9 through expanding vortex section 43 where it will distribute itself under the intake area of high pressure boiler 46. Very light products of combustion formed immediately after the entrance of the material through slot 78 into main combustion chamber 2 will, due to the very intense heat in this area, tend to rise up into secondary combustion chamber 4. Due to the high velocity swirling motion of these gases, particulate matter in this area will be centrifugally precipitated on cylindrical vertical walls 3, where, due to the high temperature, they will form molten slag which will run down wall 3, drop onto hearth 1, and proceed, together with the slag formed on the hearth, toward the bottom of the furnace and discharge point 13.

Flue gases emerging from vortex section 43 at between 2500° and 2900° will proceed up through the heat exchange or boiler section 46 where the heat energy will be extracted so that, at the point of discharge at the top of the boiler, the flue gases will emerge at approximately 600° F. At this point, the flue gases will be forced through intake annulus 48 at the bottom of high efficiency scrubber 47 within which they will be cleaned of practically all contaminants and particulate matter and then will be exhausted through discharge opening 49 with a dust loading of less than .2 pound of particulate matter per 1,000 pounds of flue gas discharged.

All material received at the plant which does not contain any garbage and therefore will not rot or smell is discharged from the shredder 38 through the pneumatic conveying duct 73, through blower 42 to storage area 26. When garbage-containing material is not being fed directly into the furnace at a sufficiently high rate to maintain full level of combustion as desired, shredded wood and paper and similar non-garbage material will be retrieved from storage area 26 through an extension of air and material handling duct 25 by one or more of the four fans 22 and fed into the furnace for combustion in a manner similar to that described above. The primary combustion chamber 6 and its entire surrounding structure can be removed from its location directly beneath the main furnace structure by rolling it on railroad wheels 17 on rails 18 to one side of the plant and replacing it for continued operation by an exact duplicate unit maintained ready as a standby at all times.

The controlling operation of the entire plant is performed by a multitude of electronically controlled instruments 58 and associated equipment located in the control room 56 within the roof structure above the operating floor. An electronic computer located here will automatically control the operation of all the blowers, air valves, gas valves, material feed rates of various kinds of materials considered to maintain a steady optimum level of a combustion within the furnace and operation of the steam boiler and associated equipment. The twenty truck scales 64 which are built into the surface of the operating floor 32 are all electronically operated scales, the operation of which are controlled by the computer in the operating room. Four operators in the control room each control the operation of five scales keeping track of which materials are discharged into the receiving hopper and by remote control removing explosives or other undesirable items from being fed into the shredder. Stairways 61 and 62 provide access and egress from the control room and offices located within the roof structure.

While I have illustrated and described a presently preferred practiced and embodiment of my invention, it will be understood that it may be otherwise embodied within the scope of the following claims.

I claim:

1. An incinerator for garbage and refuse comprising a main combustion chamber, means for shredding refuse to substantially uniform size, means for carrying said refuse from the shredding means to a point adjacent the top of said main combustion chamber, means for feeding said shredded refuse with air tangentially along the wall of the main combustion chamber, a primary combustion chamber beneath said main combustion chamber and connected thereto, means for feeding a high calorific fuel into said primary combustion chamber to provide a high temperature therein, a secondary combustion chamber connected to the main combustion chamber receiving the products of combustion and fluidized residue from the main combustion chamber to complete the combustion of such residues, a heat exchanger receiving the products of combustion from said secondary combustion zone to recover the heat therefrom and a gas scrubber receiving the products of combustion from the heat exchanger and removing substantially all particulate residues therefrom, said scrubber discharging the scrubbed products of combustion to the atmosphere.

2. An incinerator as claimed in claim 1 wherein the main combustion chamber is an inverted cone connected at its apex to the primary combustion chamber and providing a vortex motion to the tangentially fed refuse and air.

3. An incinerator as claimed in claim 1 having air inlet means at the junction of the main and primary combustion chambers and means supplying pre-heated air under pressure to such inlet means.

4. An incinerator as claimed in claim 1 wherein the primary combustion chamber is mounted on wheels, said wheels runnings on tracks extending from beneath the main combustion chamber to a spaced work area whereby said primary combustion chamber may be moved to a work area for repairs.

5. An incinerator as claimed in claim 1 having an annular refuse receiving hopper spaced from and surrounding the main combustion chamber, movable bottom means in said hopper moving in a circle around the main combustion chamber and discharge means at the means for shredding refuse, removing refuse from the hopper and bottom means to the shredding means.

6. An incinerator as claimed in claim 5 having an annular storage well surrounding and spaced from the refuse receiving hopper selectively receiving shredded refuse from the shredding means and means removing refuse from said storage well for delivery to the means for feeding refuse with air to the main combustion chamber.

7. An incinerator as claimed in claim 1 wherein the heat exchanger is a steam boiler.

8. An incinerator as claimed in claim 1 wherein the means for carrying refuse from the shredding means to the main combustion chamber is a pneumatic feed line and a source of high pressure air feeding said line.

9. An incinerator as claimed in claim 2 wherein the secondary combustion chamber is a cylinder above the main combustion chamber, open at the bottom to said main combustion chamber and provided with a top having an axial opening discharging into the apex of a conical vortex chamber.

10. An incinerator as claimed in claim 9 wherein the primary combustion is mounted on wheels, said wheels running on tracks extending from beneath the main combustion chamber to a spaced work area whereby said primary combustion chamber may be moved to a work area for repairs.

11. The method of incinerating garbage and refuse which comprises the steps of:
(a) shredding the garbage and refuse;
(b) feeding the shredded garbage and refuse in air tangentially into the top of a main combustion chamber to form a downwardly moving spiral along the wall thereof;
(c) introducing a high temperature flame and air into the axis of the main combustion chamber to create an updraft axially of the main combustion chamber;
(d) delivering the products of combustion into a secondary combustion zone together with unburned particulate matter; and
(e) discharging the products of combustion from said secondary combustion zone into a vortex chamber to cause particulate matter to be dropped out of the gases.

12. The method as claimed in claim 11 wherein the products of combustion are passed successively from the vortex chamber through a heat exchanger where their heat is removed and a gas scrubber where remaining particulate material is substantially removed.

References Cited

UNITED STATES PATENTS

| | | | |
|---|---|---|---|
| 2,614,513 | 10/1952 | Miller et al. | 110—7 |
| 2,808,011 | 10/1957 | Miller et al. | 110—7 |
| 3,404,643 | 10/1968 | Ankersen | 110—10 |

JAMES W. WESTHAVER, Primary Examiner

U.S. Cl. X.R.

110—18

UNITED STATES PATENT OFFICE
CERTIFICATE OF CORRECTION

Patent No. 3,457,883                                  July 29, 1969

Borge Richard Ankersen

It is certified that error appears in the above identified patent and that said Letters Patent are hereby corrected as shown below:

Column 1, line 23, cancel "combustion"; same line 23, "connected to the top of the" should read -- and delivering the same to a heat ex- --. Column 3, line 2, "60" should read -- 6 --; line 17, "tagential" should read -- tangential --.

Signed and sealed this 27th day of January 1970.

(SEAL)
Attest:

Edward M. Fletcher, Jr.
Attesting Officer

WILLIAM E. SCHUYLER, JR.
Commissioner of Patents